US012609008B1

(12) United States Patent
Van Oort et al.

(10) Patent No.: US 12,609,008 B1
(45) Date of Patent: Apr. 21, 2026

(54) AUTONOMOUS NETWORK CONNECTIVITY SYSTEMS AND RELATED DEVICES AND METHODS

(71) Applicant: R&D Industries, Inc., Milford, IA (US)

(72) Inventors: Donald Van Oort, West Okoboji, IA (US); Christopher Van Oort, Ames, IA (US); John Larson, Arnolds Park, IA (US)

(73) Assignee: R&D Industries, Inc., Milford, IA (US)

( * ) Notice: Subject to any disclaimer, the term of this patent is extended or adjusted under 35 U.S.C. 154(b) by 0 days.

(21) Appl. No.: 18/471,155

(22) Filed: Sep. 20, 2023

Related U.S. Application Data

(60) Provisional application No. 63/408,377, filed on Sep. 20, 2022.

(51) Int. Cl.
*G07F 19/00* (2006.01)

(52) U.S. Cl.
CPC .......... *G07F 19/211* (2013.01); *G07F 19/209* (2013.01)

(58) Field of Classification Search
CPC .............................. G07F 19/211; G07F 19/209
See application file for complete search history.

(56) References Cited

U.S. PATENT DOCUMENTS 10,616,347 B1 * 4/2020 Van Oort ................ H04L 47/20
2015/0365320 A1 * 12/2015 Xu .......................... H04L 45/00 370/226

* cited by examiner

*Primary Examiner* — Matthew Mikels
(74) *Attorney, Agent, or Firm* — DENTONS DAVIS BROWN PC; Matthew Warner-Blankenship; Kassandra Ricklefs

(57) ABSTRACT

A system for maintaining network connectivity comprising a network connected device, a probe, and a monitoring platform electronically connected to the network connected device through a first network system, wherein the monitoring device can autonomously activate a second network system if the first network system is interrupted.

19 Claims, 10 Drawing Sheets

AUTONOMOUS NETWORK CONNECTIVITY SYSTEMS AND RELATED DEVICES AND METHODS

CROSS-REFERENCE TO RELATED APPLICATION(S)

This application claims priority to U.S. Provisional Application No. 63/408,377 filed Sep. 20, 2022, and entitled Autonomous, Self-Healing Network Connectivity Utilizing On-Demand Provisioning, which is hereby incorporated by reference in its entirety under 35 U.S.C. § 119(e).

TECHNICAL FIELD

The disclosure relates generally to various systems, devices, and methods for monitoring and providing internet or network connectivity, and in particular to the systems, devices, and methods for restoring internet connectivity.

BACKGROUND

There are many internet connected devices, particularly Internet of Things (IoT) devices, which use cellular networks as their source of internet connectivity. Such devices are used in a wide range of applications including but not limited to transportation and logistics, utility metering, environmental sensors, security applications, oil and gas production, fleet management, agriculture, smart cities, military, government, healthcare, retail, digital signage, scientific monitoring, industrial applications, banking, vending machines, and others that would be understood by those of skill in the art.

These devices can experience internet connectivity failures, for a variety of reasons as would be appreciated. One example of such a device is an Automatic Teller Machine ("ATM"). As would be understood, under normal conditions an ATM is always connected to the internet and/or to the data network of the bank or the service provider(s) of the bank. However, external events, such as a storm, accident, or attack, could cause a loss of service, for example by taking a key cellular tower offline. The loss of service can cause the ATM to lose internet connectivity and the ability to communicate with the bank or the service provider(s) of the bank. In the case of an ATM, this loss of service could pose a security risk to the ATM and the assets contained therein, as the ATM could be vandalized and its assets taken.

Various prior known solutions to the issue of having an internet connected device going offline unexpectedly include maintaining two internet connections and configuring a router/firewall to failover to a secondary/back-up connection in the event the primary connection fails. These prior known systems allow the device to failover to the back-up connection and failback to the primary connection when connectivity is restored. However, these prior solutions require that two internet connections be simultaneously maintained, online at all times, despite only the primary network being necessary for a majority of the time. Maintaining two or more connections adds significant cost to operating the internet connected devices because both connections must be paid for whether in use or not.

BRIEF SUMMARY

Described herein are various systems, methods, and related devices for autonomously restoring network connectivity to a device, system, or component. In various implementations, the disclosed devices, systems, and methods are configured such that a secondary internet connection for an IoT device is only activated, on-demand, when necessary. This on-demand behavior allows for devices to utilize a secondary connection but does not require that the secondary connection be active when not in use and does not require manual intervention at the device site to activate the secondary connection when it is needed. The also system allows for central decision making for activation of a secondary connection in accordance with business rules/logic. The disclosed systems, methods, and devices also minimize security risks because the secondary connection is not active when not in use and therefore is not a potential source of ingress into the network/device.

Still further disclosed herein are platforms allowing for managing a multitude of connected devices using a combination of artificial intelligence (AI), network monitoring, and smart-edge technologies. The various components of the platforms may be implemented with hardware and/or software.

In Example 1, a system for maintaining network connectivity comprising a network connected device, a probe in communication with the network connected device, and a monitoring platform in electronic communication with the network connected device through a first data carrier, wherein the monitoring platform is configured to monitor the state of a connection between the network connected device and the first data carrier, and wherein the monitoring system is configured to activate a second data carrier when the connection between the network connected device and the first data carrier is interrupted.

Example 2 relates to the system of any of Examples 1 and 3-8, wherein the probe is a hardware or software appliance capable of sending packets to the monitoring platform.

Example 3 relates to the system of any of Examples 1-2 and 4-8, further comprising and edge device in communication with the network connected device and wherein the edge device connects the network connected device to the first data carrier and the second data carrier.

Example 4 relates to the system of any of Examples 1-3 and 5-8, wherein the monitoring platform determines connection interruptions by monitoring one or more of signal level, signal-to-noise ratio, latency, signal interference, data throughput, jitter, and error rate.

Example 5. relates to the system of any of Examples 1-4 and 6-8, wherein the first data carrier and the second data carrier are cellular data carriers.

Example 6 relates to the system of any of Examples 1-5 and 7-8, wherein the second data carrier is inactive then the first data carrier is active.

Example 7 relates to the system of any of Examples 1-6 and 8, wherein an edge device in communication with the network connected device uses dynamic provisioning for activating the second data carrier.

Example 8 relates to the system of any of Examples 1-7, wherein the monitoring platform activates the second data carrier by sending an API request to the second data carrier.

In Example 9, a system for maintaining network connectivity comprising a probe in communication with a networked device, an edge device in electronic communication with the status probe, and a monitoring platform in electronic communication with the edge device and the status probe through a first data carrier, wherein the monitoring platform is configured to receive packets from the probe for monitoring a connection between the networked device and the first data carrier, and wherein the monitoring platform autonomously activates a second data carrier when the monitoring platform determines the connection between the networked device and the first data carrier is interrupted.

Example 10 relates to the system of any of Examples 9 and 11-14, wherein the connection between the networked device and the first data carrier is interrupted when the connection is down for more than a threshold period of time.

Example 11 relates to the system of any of Examples 9-10 and 12-14, wherein the threshold period of time varies based on the time of day or day of the week.

Example 12 relates to the system of any of Examples 9-11 and 13-14, wherein the monitoring platform determines that the connection is interrupted by monitoring one or more of signal level, signal-to-noise ratio, latency, signal interference, data throughput, jitter, and error rate.

Example 13 relates to the system of any of Examples 9-12 and 14, wherein the connection between the networked device and the first data carrier is interrupted when threshold levels for one or more of signal level, signal-to-noise ratio, latency, signal interference, data throughput, jitter, and error rate are exceeded.

Example 14 relates to the system of any of Examples 9-13, wherein the second data carrier is inaction until the monitoring platform activates second data carrier by sending an API request.

In Example 15, a system for maintaining network connectivity comprising a probe in electronic communication with a device, an edge device in electronic communication with the status probe and the device, a monitoring platform electronically connected to the edge device and the status probe through a first carrier wherein the monitoring platform periodically monitors a status of a connection between the edge device and the first carrier, and computational logic contained in the monitoring platform capable of autonomously activating a second carrier when the connection between the edge device and the first carrier is interrupted, wherein the connection is interrupted when the connection is down for more than a threshold period of time or when one or more of signal level, signal-to-noise ratio, latency, signal interference, data throughput, jitter, and error rate exceed a threshold amount.

Example 16 relates to the system of any of Examples 15 and 17-20, further comprising carrier link technology for providing connection to the first carrier and the second carrier.

Example 17 relates to the system of any of Examples 15-16 and 18-20, wherein the monitoring platform is configure to reactive the first carrier when the connection resumes or is within threshold values, and wherein the monitoring platform deactivates the second carrier when the first carrier is reactivated.

Example 18 relates to the system of any of Examples 15-17 and 19-20, wherein the probe is a software or hardware appliance.

Example 19 relates to the system of any of Examples 15-18 and 20, wherein the threshold values are determine based on business needs.

Example 20 relates to the system of any of Examples 15-19, wherein the second data carrier is inactive until monitoring platform activates the second data carrier by sending an API request.

While multiple embodiments are disclosed, still other embodiments of the disclosure will become apparent to those skilled in the art from the following detailed description, which shows and describes illustrative embodiments of the disclosed apparatus, systems and methods. As will be realized, the disclosed apparatus, systems and methods are capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
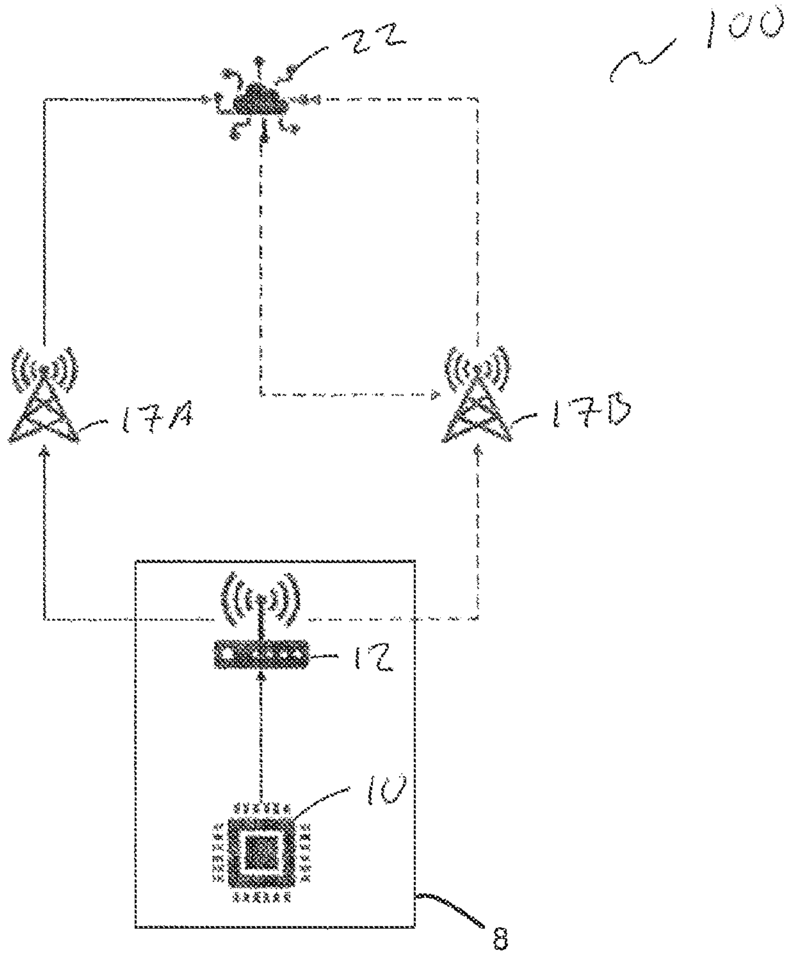
FIG. 1 is a diagram of the system showing the connection routes between components, according to one implementation.

The various implementations disclosed or contemplated herein relate a platform allowing for managing a multitude of connected devices using a combination of artificial intelligence (AI), network monitoring, and smart-edge technologies. Further disclosed is an autonomous, self-healing system 100 and associated devices and methods for providing, restoring, and diagnosing network connections for various networked devices. Various implementations further relate to autonomously restoring an interrupted or degraded network connection. In various implementations, the disclosed systems, devices, and methods relate to utilizing a dormant network connection(s) which can be activated autonomously to retore network connectivity.

The devices, systems, and methods disclosed herein may be implemented on any connected device, including without limitation IoT devices, and any other type of device with connectivity as would be understood. The various devices may be connected by 5G or other frequencies, in addition to Citizens Broadband Radio Service (CBRS), indoor cellular, WiFi, Satellite, and broadband, among other connection types as would be appreciated.

The various implementations provide for connectivity within area networks. These area networks may include, but are not limited to cellular networks, private networks, virtual private networks (VPNs), and other network structures or combinations thereof as would be understood.

Various implementations provide a system of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The apparatus may include a local probe hardware, desktop, server client, phone app or other software or hardware running software that can be used to perform the actions.

Certain of the disclosed implementations can be used in conjunction with any of the devices, systems or methods taught or otherwise disclosed in U.S. Pat. No. 10,915,595, filed Oct. 7, 2015 and entitled "Devices, Systems, and Method for Associating Tangible Asset with an Website or Target URL," U.S. Pat. No. 10,616,347, filed Oct. 20, 2017 and entitled Devices, Systems and Methods for Internet and Failover Connectivity and Monitoring," U.S. patent application Ser. No. 16/032,924, filed Jul. 11, 2018 and entitled "Systems, Methods and Apparatus for Local Area Network Isolation," U.S. Pat. No. 11,481,370, filed Oct. 30, 2019 and entitled "Devices, Systems, and Methods for Optimizing of Data Sets," U.S. patent application Ser. No. 16/777,561, filed Jan. 30, 2020 and entitled "Apparatus, Systems and Methods for Multi-Carrier and Multi-Tenant End-to-End Private Wide Area Network," U.S. Pat. No. 11,502,895, filed Sep. 8, 2020 and entitled "Internet Failover Connectivity and Monitoring," and U.S. patent application Ser. No. 17/959,183, filed Oct. 3, 2022 and entitled "Devices, Systems, and Methods for Automatically Locating a Network Failure or Disruption," each of which is incorporated by reference in its entirety herein.

As used herein, "electronic communication" and "network connectivity" are understood to encompass all forms of electronic communication and network connectivity known in the art, except where otherwise noted. It includes, but is not limited to, both direct wired connections and wireless connections. Wired connections include, but are not limited to, fiber optic, cable, broadband, and various other electronic communication methods known in the art. Wireless connections include all manner of wireless technologies known in the art, including but not limited to Wi-Fi, Bluetooth, Zwave, low power cellular using NB-IoT (narrowband internet of things), low power cellular using LTE-M (long-term evolution, machine-type communication), 4G, 5G, various other cellular communication technologies, satellite connections, and the like. This also includes mesh networks, centralized networks, and any other network structures that would be appreciated by those in the art. Mesh networks may include LoRa, LoRaWAN+LoRa to form a Low Power Wide Area (LPWA) network, thread mesh networks, and the like. Network connectivity may also include multi-radio systems utilized to relay traffic back and create a high-bandwidth carrier connection.

Turning to the figures in more detail, in various implementations, the system 100 includes a probe 10, an edge device 12, a monitoring platform 22, and one or more network systems 17A, 17B, shown in FIG. 1. In certain implementations the edge device 12 is a component in an Internet of Things (IoT) device 8.

In various implementations, the probe 10 is an appliance installed in the network and downstream of, or otherwise in electronic communication with a device 8. In certain implementation, the probe 10 is configured to perform area network connectivity testing on regular intervals, as discussed herein. As discussed further below, in alternate implementations, the probe 10 can be integrated directly into an edge device 12, such as a modem, router, firewall or other appliance, and can be hardware but also firmware or software configured to improve the functioning of the installed device. In various implementations, probe 10 software can be run on a desktop, a client application on any local area network (LAN) connected device, an iOS or Android application, a firewall, server, phone, or other device appreciated by those of skill in the art.

In various implementations the probe 10 is an installable device. The probe 10 may be software or firmware-based. In certain of these implementations, the local probe 10 can be a dedicated hardware device or software running on a server, network access controller, or other network connected device. In further alternative implementations, the software functions of a hardware-based probe 10 may be implemented in a software application which can run on a router, or firewall, PC, or virtual machine on the network. That is, a separate item of hardware is not necessary and the probe 10 and its functions can be integrated into other components of a device 8, network, or Wide Area Network (WAN).

In various implementations, the probe 10 is in electronic communication with or otherwise installed on an edge device 12 of an IoT device 8 or other networked device 8. As would be understood, the edge device 12 provides a connection of the device 8 to a network system 17A, 17B. The device 8 is then optionally connected to a monitoring platform 22 via a network system 17A, 17B and edge device 12.

In various implementations the one or more network systems 17A, 17B include cellular networks 16A, 16B (shown in FIG. 2) connected to the internet 20 via an internet port, as would be appreciated. As would be understood, an internet port is any connection, device, router, modem, or the like that allows electronic communication with the internet.

Various components may use carrier-grade network address translation ("CG-NAT") or other dynamic IP address connection technologies, such as VPN tunnels. Typically, it is not possible to remotely manage, monitor, or otherwise control devices that do not have static IP addresses. The control of these dynamic IP components can be achieved through the technology previously disclosed in the incorporated references. Various implementations may implement dynamic IP address connection technologies.

FIG. 1 is a diagram of an autonomous, self-healing system 100 (also referred to herein as a "platform 100") for monitoring, restoring, and diagnosing network connection for a multitude of devices. In various implementations the system 100 may be implemented with any number of device from one to thousands. In these and other implementations, the system 100 includes a status probe 10 installed on or otherwise connected to an edge device 12 in communication with a device 8, such as an IoT device. The edge device 12 may provide a connection to one or more network systems 17A, 17B.

In various implementations, the edge device 12 is also configured to switch between a primary network system 17A and a secondary network system 17B, when the connection is interrupted or degraded as will be discussed further herein. In various implementations, the edge device 12 may be commanded to transition its connection between the primary network 17A and the secondary network system 17B without manual intervention. In certain implementations, because the secondary network system 17B is not active during nominal operations, it may be referred to herein as the dormant network system 17B. Any number of secondary/dormant networks may be available.

In various implementations, the edge device 12 utilizes dual modems. In various additional or alternative implementations, the edge device 12 may be a single-radio device where the radio can be reconfigured to perform network switching. In certain implementations, the device may include two or more physical SIM cards, alternatively one eSIM may be used containing network information for multiple carriers, combinations of physical SIMs and eSIMs may be implemented, various alternative carrier link technologies may also be implemented.

As would be appreciated, both the primary and secondary network systems 17A, 17B are configured to connect the device 8 electronically with the monitoring platform 22. In various implementations, the status probe 10 is configured to send a signal/packet/ping to the monitoring platform 22 to confirm the primary connection is up or otherwise indicate connection health. For example, if the signal/packet/ping to the monitoring platform 22 is sent over the primary connection 17A is not received the system 100 may be alerted that the primary connection is down and connectivity is interrupted. Additionally, or alternatively, the signal/packet/ping may be transmitted over the primary connection 17A and upon receipt on the monitoring platform 22 indicate the health of the connection 17A including latency, jitter, stability, throughput, etc. that can affect the performance of the connection. In various implementations, if the primary connection 17A is not performing within desired ranges the system 100 may be alerted that the primary connection 17A is interrupted, partially interrupted, degraded, or performing normally.

In various implementations, if connectivity is interrupted or degraded, the monitoring platform 22 can activate the secondary network system 17B and command the edge device 12 to transition traffic from the primary network system 17A to the secondary network system 17B.

Figure 2:
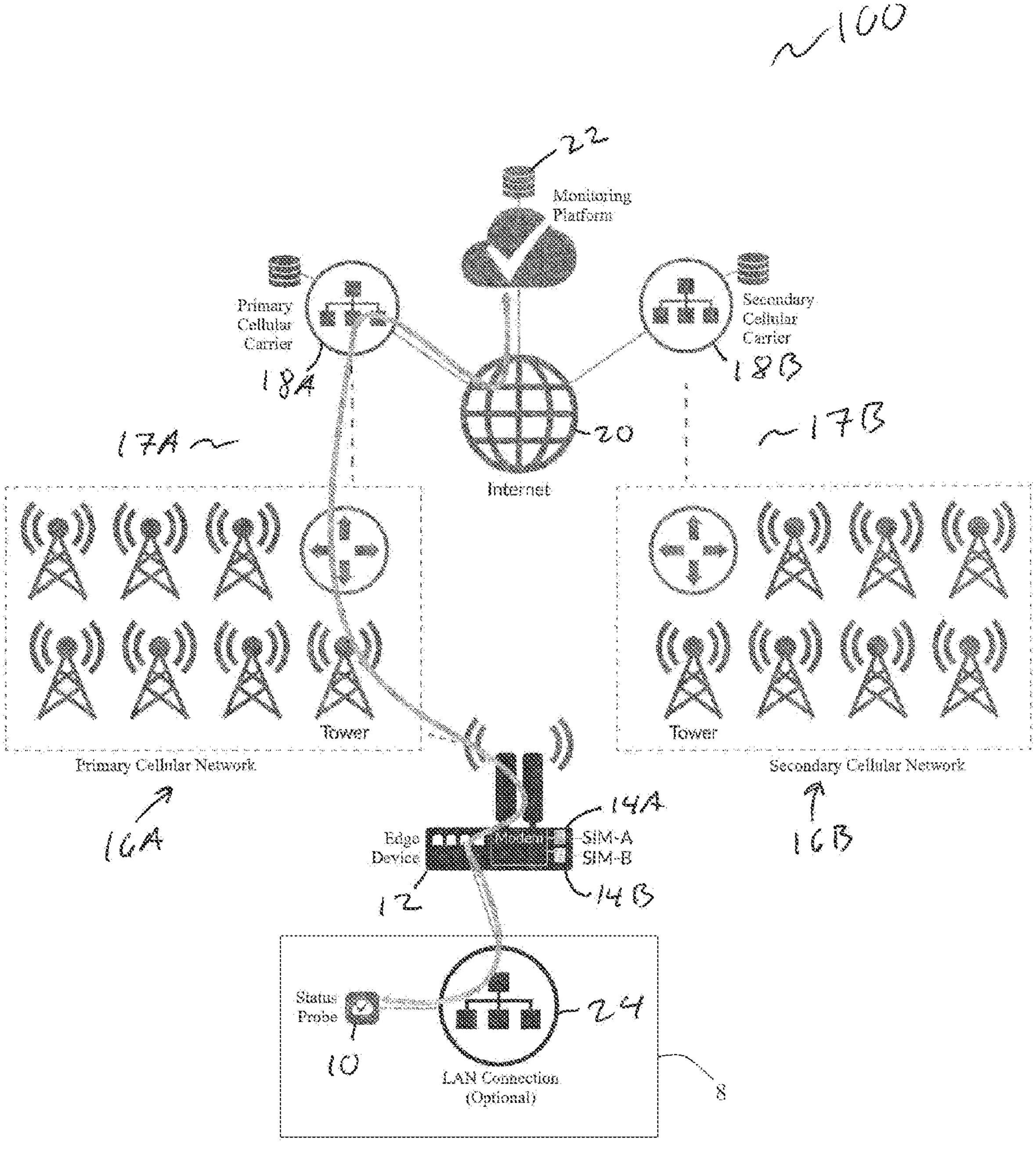
FIG. 2 is a diagram of the system under normal operation using a cellular network to provide internet connectivity, according to one implementation.

Turning now to FIG. 2, in various implementations, the edge device 12 may include two SIM cards 14A, 14B for connecting to the primary network system 17A and the secondary network system 17B. As would be understood, a SIM card 14A, 14B is a either a physical or electronic card to identify a subscriber of a service, such as a cellular carrier. Those of skill in the art would appreciate that a SIM card 14A, 14B (which may optionally be an eSIM) provides network-specific information to authenticate and identify subscribers of a network, and are typically required for cellular connectivity. As used herein the term SIM card encompasses both physical and eSIM cards.

In various alternative implementations, the system 100 includes alternative network registration technology similar to SIM cards. For example, in implementations, utilizing satellite connectivity (non-terrestrial networks) alternative mechanisms for modem registration may be implemented in place of SIM cards. As used herein the term Carrier Link Technology (CLT) refers to any technology that links a device to a carrier network, including SIMs, eSIM, and the like.

In some implementations where an eSIM is used, there may be no need for a primary and secondary eSIM, but instead there may be a primary and secondary state of a singular eSIM. That is, an eSIM may contain information for more than one data carrier.

In various implementations, the primary cellular network 16A for the primary cellular carrier 18A together are considered the primary network system 17A. The secondary network system 17B include the secondary cellular network 16B for the secondary cellular carrier 18B. It would be understood, that the network systems 17A, 17B for the various cellular networks 16A, 16B may overlap, that is, share towers and connection locations. The network systems 17A, 17B may also include indoor cellular services and CBRS.

In certain implementations, the probe 10 is configured to send electronic communication pulses/pings/packets to the monitoring platform 22, as discussed above. These pulses are recognizable by the monitoring platform 22, such that a connection with the probe 10 can be verified and monitored by the presence of the pulses. In some implementations, the pulses maybe encrypted to improve network security.

In various implementations, the probe 10 electronically communicates with or is installed on the edge device 12, optionally through direct electronic communication or through a Local Area Network ("LAN") connection 24. In certain implementations, the edge device 12 is connects to the primary and secondary networks 17A, 17B. Optionally, the edge device 12 includes a cellular modem that allows the use of CLT, SIM cards or the like to connect to data networks 17A, 17B, as would be understood.

In certain implementations, the edge device 12 includes a primary CLT/SIM card 14A and a secondary CLT/SIM card 14B. The primary CLT/SIM card 14A is configured to be recognized by the primary cellular carrier 18A, which will allow wireless electronic communication through a primary network 16A to enable the device 8 to electronically connect to the monitoring platform 22, and optionally the internet 20.

In various implementations, monitoring platform 22 is configured to detect if the connection to the device 8 to the primary network 16A has been interrupted or degraded. In certain implementations, the monitoring platform 22 is also connected to the internet 20, and can electronically communicate with various components of the system 100 through its internet 20 connection.

In various implementations, the monitoring platform 22 is a cloud based system. Various implementation of the monitoring platform 22 include corresponding computer systems, apparatus, and computer programs recorded on one or more computer storage devices, each configured to perform the actions of the methods.

The pulses from the probe 10 can be sent at regular intervals to the monitoring platform 22. The monitoring platform 22 can be configured to anticipate these pulses so that when they are received, the monitoring platform 22 has data evidencing a stable electronic connection with the status probe 10, and therefore evidencing an electronic connection with the edge device 12 and device 8. As would be understood, and as discussed herein, the pulses 10 monitor the connection status and connection health.

Figure 3:
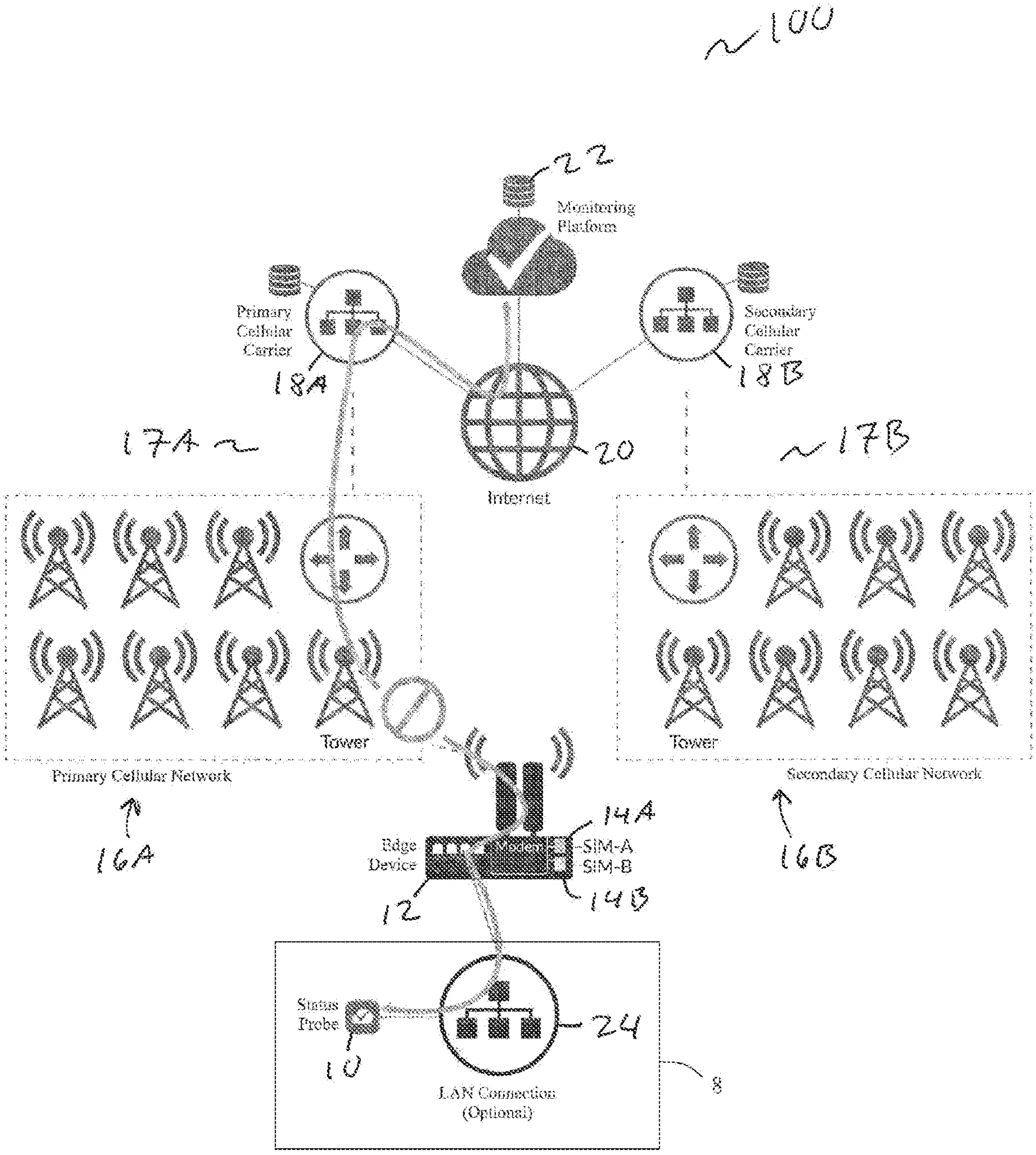
FIG. 3 is a diagram of the system using a cellular network with an interruption in electronic communication, according to one implementation.

FIG. 3 shows a diagram of the implementation of the system 100 of FIG. 2, where electronic communication between the device 8 and primary network 16A is interrupted. An interruption in communication between the device 8 and network 16A can be caused by a large variety of factors, including but not limited to weather, cyber-attacks, power outages, criminal acts such as vandalism or theft, and physical interference such as from new construction. Interruption in the network 16A may also include degraded connections (e.g. slow or intermittently bad connections) in addition to down connections. In various implementations, with electronic communication between the edge device 12 and the monitoring platform 22 interrupted, the pulses from the status probe 10 would no longer be received by the monitoring platform 22 or when received would indicate a degraded connection.

In certain implementations, the system 100 may include a time-based program where if a pulse from the probe 10 is not received when a threshold period of time the monitoring platform 22 may try and activate the secondary connection. Further implementations, the system 100 may include a tertiary carrier or a low power WAN connection to be used to send a message to the device 8 to execute one or more troubleshooting steps, such as rebooting.

In one specific example, the threshold period of time for receiving a pulse from the probe 10 is set to five minutes. If the device 8 cannot be reached for more than 5 minutes the system 100 may automatically turn on, register, configure, and switch the device over to another carrier.

In another example, the threshold for non-responsiveness is not a period of time, but rather a number of missed pulses or fuzzy time, as discussed in the incorporated references. In some implementations, two or more thresholds would have to be exceeded before the system 100 initializes connecting to a secondary carrier. This type of threshold requirements may be necessary to avoid connecting to a secondary carrier for a momentary loss event.

Figure 4:
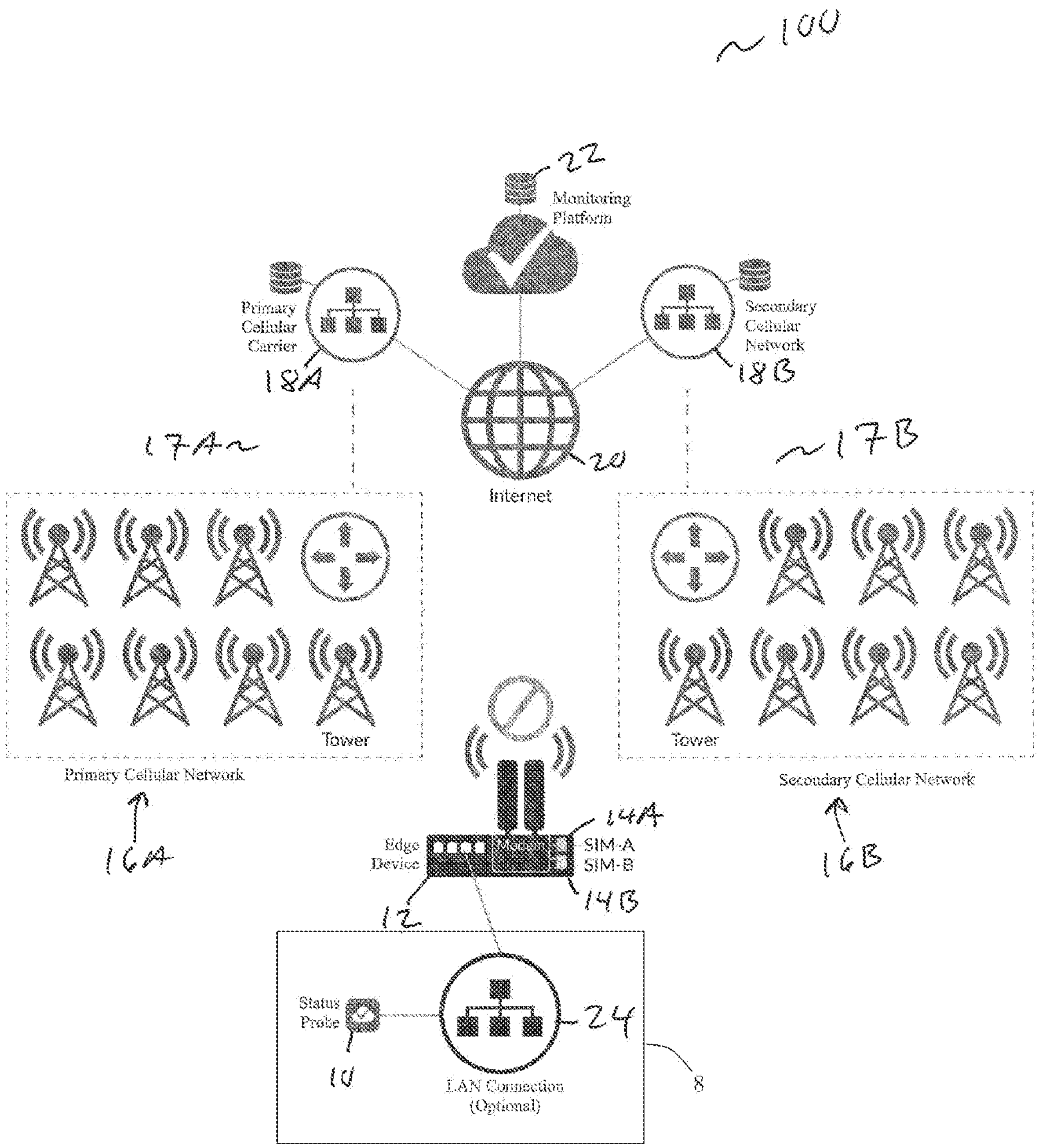
FIG. 4 is a diagram of the system using a cellular network with acknowledged interruption in communication, according to one implementation.

FIG. 4 shows a diagram of the system 100 where monitoring platform 10 has recognized that connection to the primary network 16A has been interrupted. In various implementations, interruption of a network connection may not require the complete absence of signal transmission, but can be established through weak signal transmission, irregular signal transmission, high signal latency, or other irregularities in the electronic communication that would cause difficulty in communication/degradation of connections between the various components, in addition to total absence of signal transmission. In certain implementations, thresholds for parameters like signal level, signal to noise ratio, distortion, latency, signal interference, data throughput, jitter, error rate, and other similar parameters known in the art may be set within the system 100 to determine when a connection is deemed interrupted. The thresholds may be user-defined and selected or otherwise defined. The thresholds may be different for different devices, implementations, or situations. That is, different devices may have different tolerances for network interruptions. In various implementations, the system 100 is configured to store and implement the various thresholds that may differ between devices. Connection interruptions can also be determined through the use of artificial intelligence or machine learning technologies, in addition to other methods known in the art.

In various additional or alternative implementations, the edge device 12 is configured to detect if its connection to the primary network 16A has been interrupted or degraded. In various implementations, the edge device 12 or probe 10 includes logic instructing the device 8/edge device 12 to attempt to use its secondary CLT/SIM card 14B in addition to the primary CLT/SIM card 14A if the connection to the primary network 16A is interrupted.

In the implementation shown in FIG. 4, the secondary CLT/SIM card 16B is not activated by the secondary carrier 18B. Because of this, the edge device 12 will not be allowed to electronically connect to the secondary network 16B. In various implementations of the system 100, the edge device 12 can be configured to attempt use of the secondary CLT/SIM card 14B at all times, rather than attempting its use upon an interrupted connection with the primary network 16A.

It is understood that activated data networks typically require payment for their continued service. By not keeping the secondary network 16B active, no payment would be required until its activation. As such, use of the disclosed system 100 may provide significant cost savings for owners of devices 8 implementing the system 100 while also providing backup network connectivity, by not requiring payment for maintaining a backup connection unless it is in use.

Figure 5:
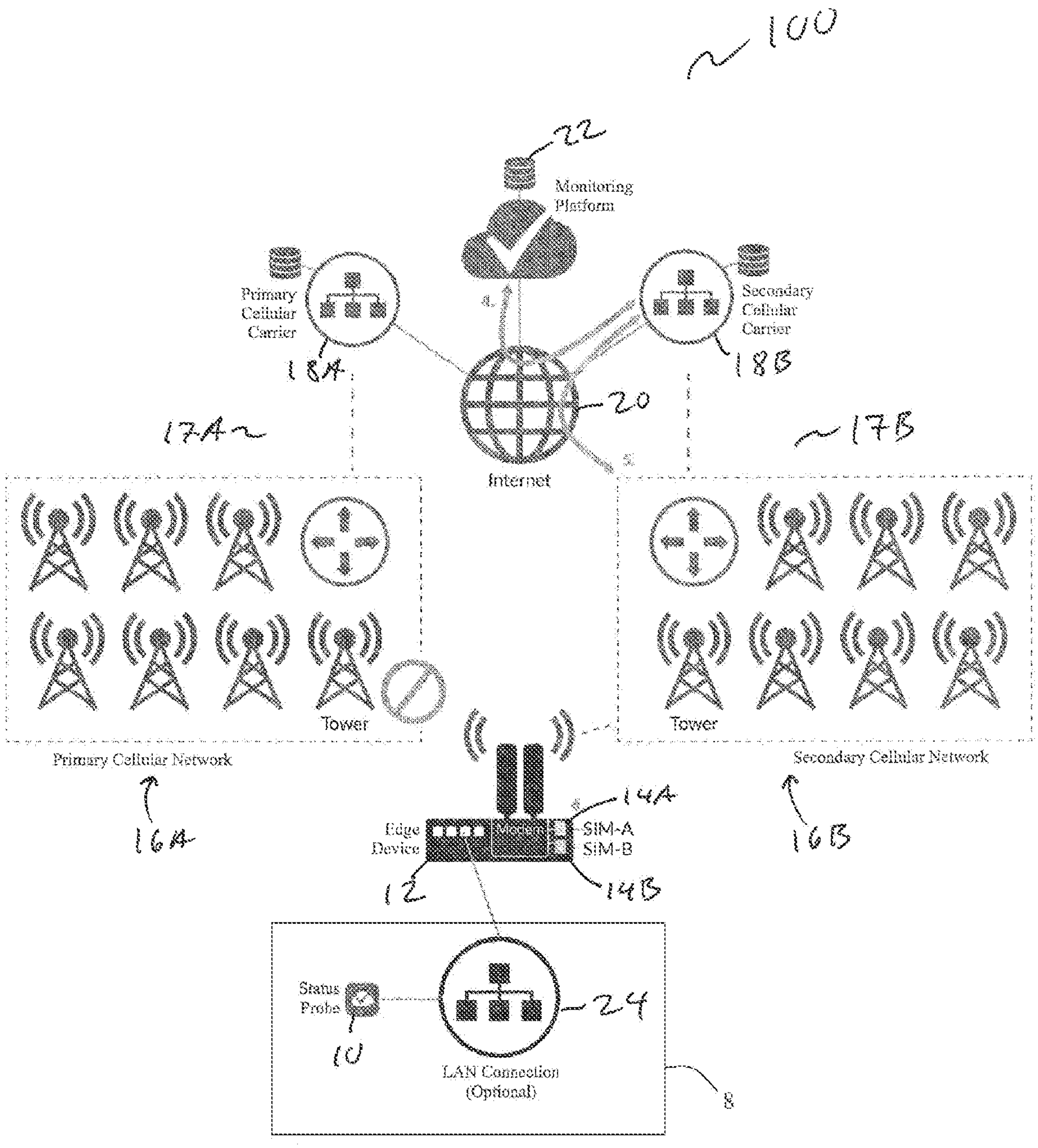
FIG. 5 is a diagram of the system using a cellular network activating a secondary connection, according to one implementation.

FIG. 5 shows a diagram of the system 100 where the monitoring platform 22 detects that its connection to the probe 10 and edge device 12 through the primary network 16A has been interrupted. Once the monitoring system 22 ceases receiving pulses from the probe 10, or receives pulses with a sufficiently weak signal strength, quality, or the like, the monitoring system 22 will take action to activate the secondary CLT/SIM card 14B, such as by sending an Application Programming Interface ("API") request to the secondary data carrier 18B. Alternatively, a request is sent to a coordinator or controller.

In certain implementations, where an API or similar request cannot be sent to the secondary carrier 18B the system 100 may approve an emergency communication device of a neighboring location before an outage.

In a further implementation, if the monitoring platform 22 stops receiving pulses from the probe 10 the system 100 may implement trouble shooting steps to diagnose the cause of the loss of signal from the probe 10. The loss could be from a multitude of factors, including a carrier network fault, but also including power outages, upstream issues in the carrier network, fire, or other factors as would be understood. The system 100 may optionally provide API connectivity to power monitoring systems to determine if a power outage is the cause of the loss. In another implementation, 'crowd sourced' data such as the fact that all other connections in a city or specific geographic area are up or down could be used in trouble shooting the connection before the system 100 execute steps to activate a secondary connection.

In various implementations, the secondary carrier 18B employs on-demand provisioning, also called dynamic provisioning. On-demand or dynamic provisioning refers to a network structure where connections to the network are established or disestablished as requested rather than maintaining static connections. Due to the on-demand provisioning nature of the secondary carrier 18B, the API request can be processed quickly and the secondary CLT/SIM card 14B can be activated without human intervention, i.e. autonomously. That is, in various implementation the monitoring platform 22 provides machine-to-machine connectivity using APIs. These APIs or similar requests allow for connections to all major data carriers via any appreciated technique and to automatically/autonomously carryout operations that were previously only performed by humans.

The reception of pulses from the probe 10, or absence thereof, by the monitoring platform 22 provides a robust method of connectivity monitoring. This method allows for determinations of connectivity regardless of whether the network systems 17A, 17B provide dynamically assigned public IP addresses, provide IP addresses using CG-NAT, or provide masked IP addresses using VPN tunnels.

Figure 6A:
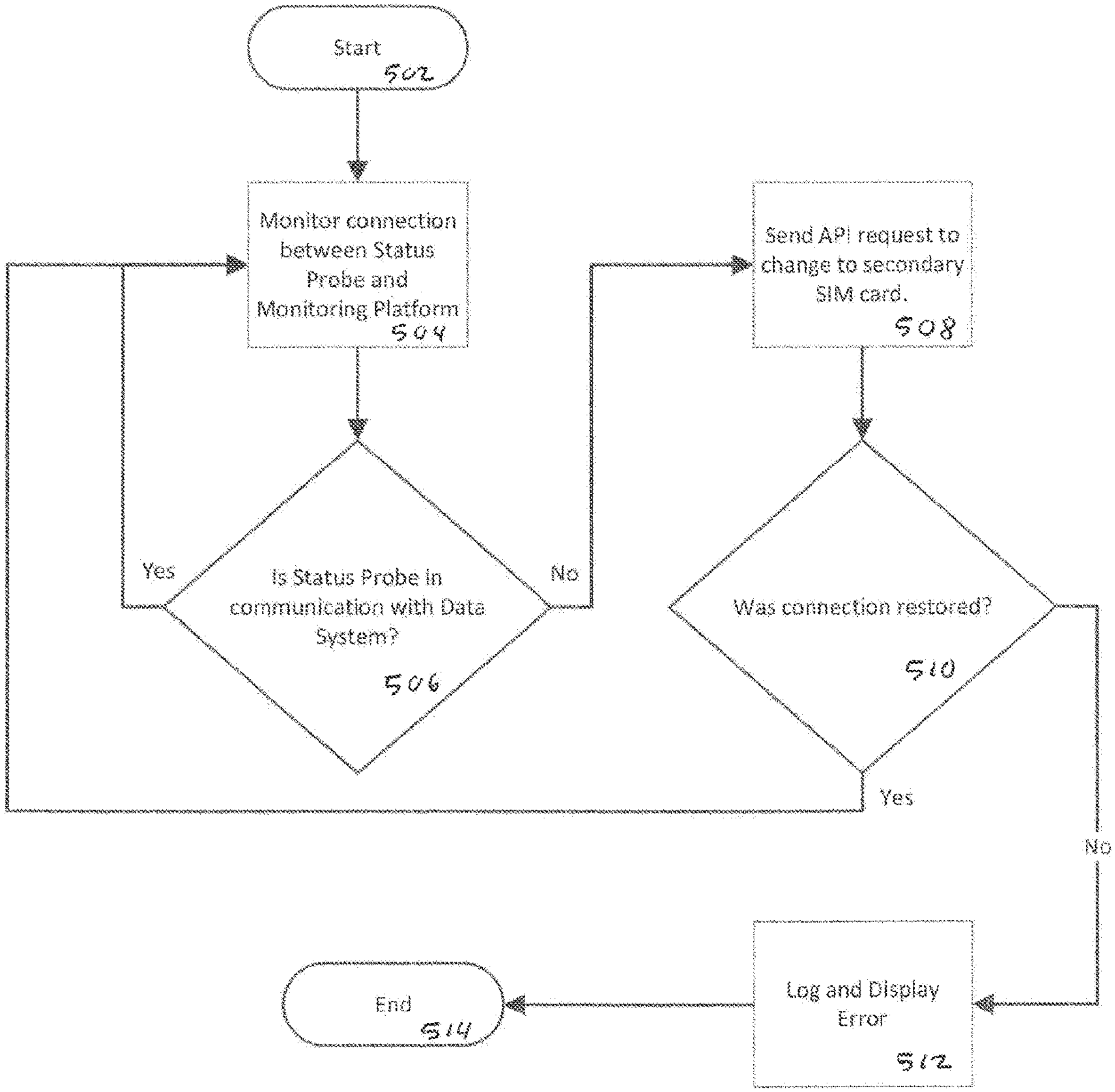
FIG. 6A is a flowchart of logic for determining connection interruption, according to one implementation.

FIG. 6A shows a diagram of exemplary logic employed in one implementation by the monitoring platform 22 in generating the request for the secondary carrier 18B. It would be understood that these logic steps are each optional and may be performed in any order or not at all. In various implementations, the steps may be performed sequentially, iteratively, or simultaneously. Various modifications to the logic would be appreciated by those of skill in the art.

In one optional step, the monitoring platform 22 monitors the connection between the probe 10 and the monitoring platform 22, such as by sending/receiving pulses from the probe 10 to verify connection (box 504). In another optional step, the monitoring platform 22 checks, optionally at regular intervals, if the probe 10 and monitoring platform 22 are still in communication, such as by confirming the receipt of pulses from the probe 10 on the monitoring platform 22 (box 506). Alternatively, the monitoring platform 22 confirm that the connection is performing within desired threshold ranges for connection health. In another optional step, if the pulses are being received satisfactorily, and optionally the status of the connection is within defined thresholds, the monitoring platform 22 continues to monitor the connection (boxes 504-506).

In another step, if the connection is interrupted, detected by the lack of receipt of pulses and/or a determination that the connection is operational outside the defined thresholds, the monitoring platform 22 optionally sends a request to the secondary data carrier 18B to activate the secondary CLT/SIM card 14B and allow the edge device 12 to connect to the secondary network 16B (box 508).

In a further optional step, the monitoring platform 22 determines if the pulses from the status probe 10 sent over the secondary connection are being received, restoring connectivity (box 510). In another optional step for implementations where connectivity is restored, pulses are again received and/or the connection is back within nominal operating parameters, the monitoring platform 22 will return to monitoring the connection (box 504).

In another optional step, if pulses sent over the secondary connection are not received, an error will be logged and displayed to operators (box 512). If an error is logged such that both the primary and secondary connections are down or degraded, an alert may optionally be sent to a user for manual diagnosis of the connection interruptions. Alternatively, if it is determined that both the primary and secondary connections are down the system 100 may optionally continue automatic diagnostics in an attempt to identify and rectify network connectivity.

Defined thresholds may vary between devices or device types or different applications and even time of day. For example, a high priority device or a device with high security risk may be programmed for a low tolerance for downtime (e.g. an ATM, a traffic light, etc.) while devices and systems performing lower priority tasks may have a high threshold for downtime (e.g. a weather station, environmental sensors). For example, a high priority device may have a downtime threshold of 5-10 minutes while for a low priority device the threshold downtime may be several hours (e.g. 12+ hours). In various implementation, the device may wait until the threshold is exceeded without restoration of connectivity of the primary connection before initializing the secondary connection. In another example, a certain device may be high priority during peak hours (e.g. business hours) and low priority at other times (e.g. overnight).

Figure 6B:
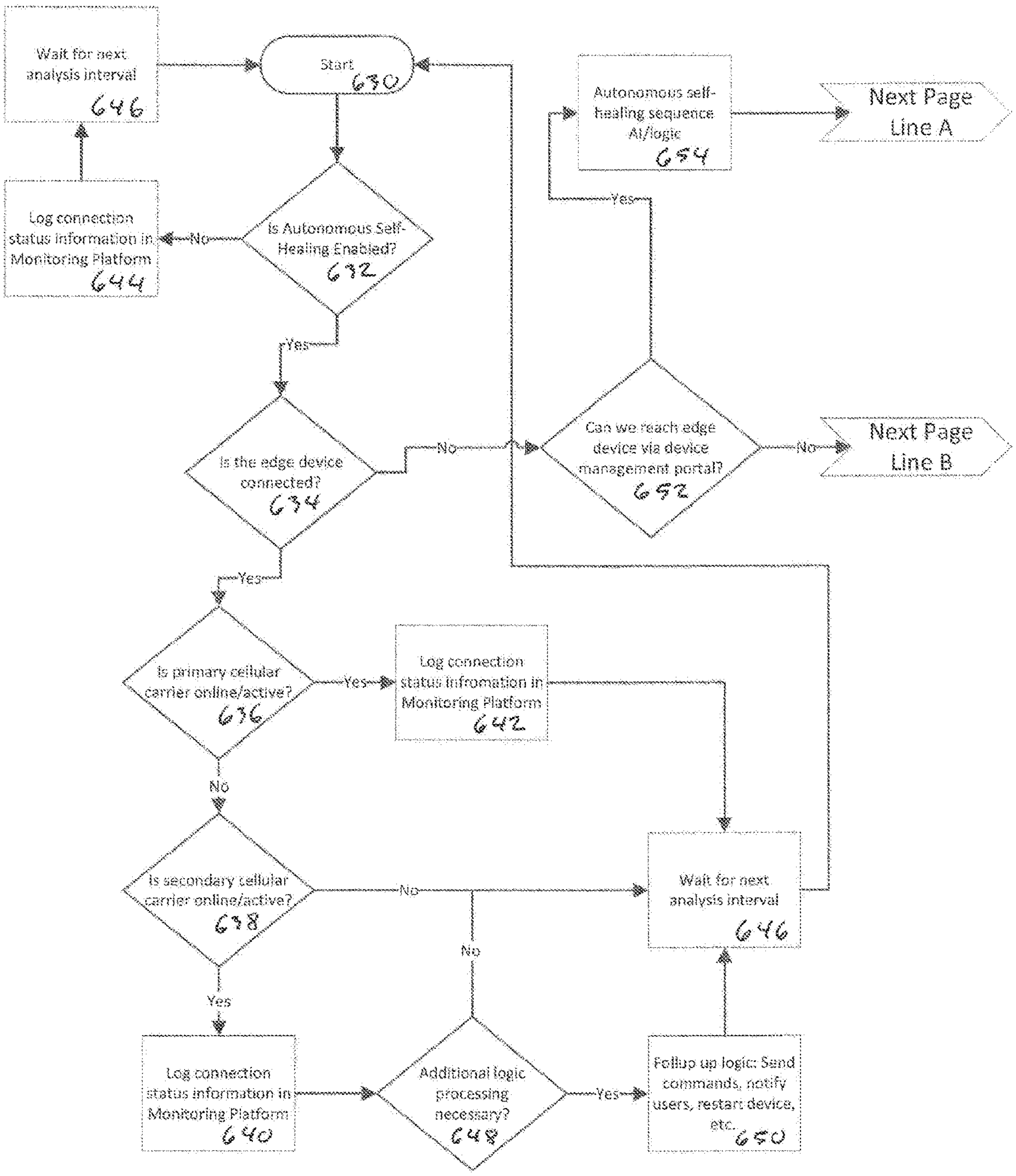
FIG. 6B is a flowchart of logic for determining connection interruption including functions to restore connectivity, according to one implementation.
Figure 6B:
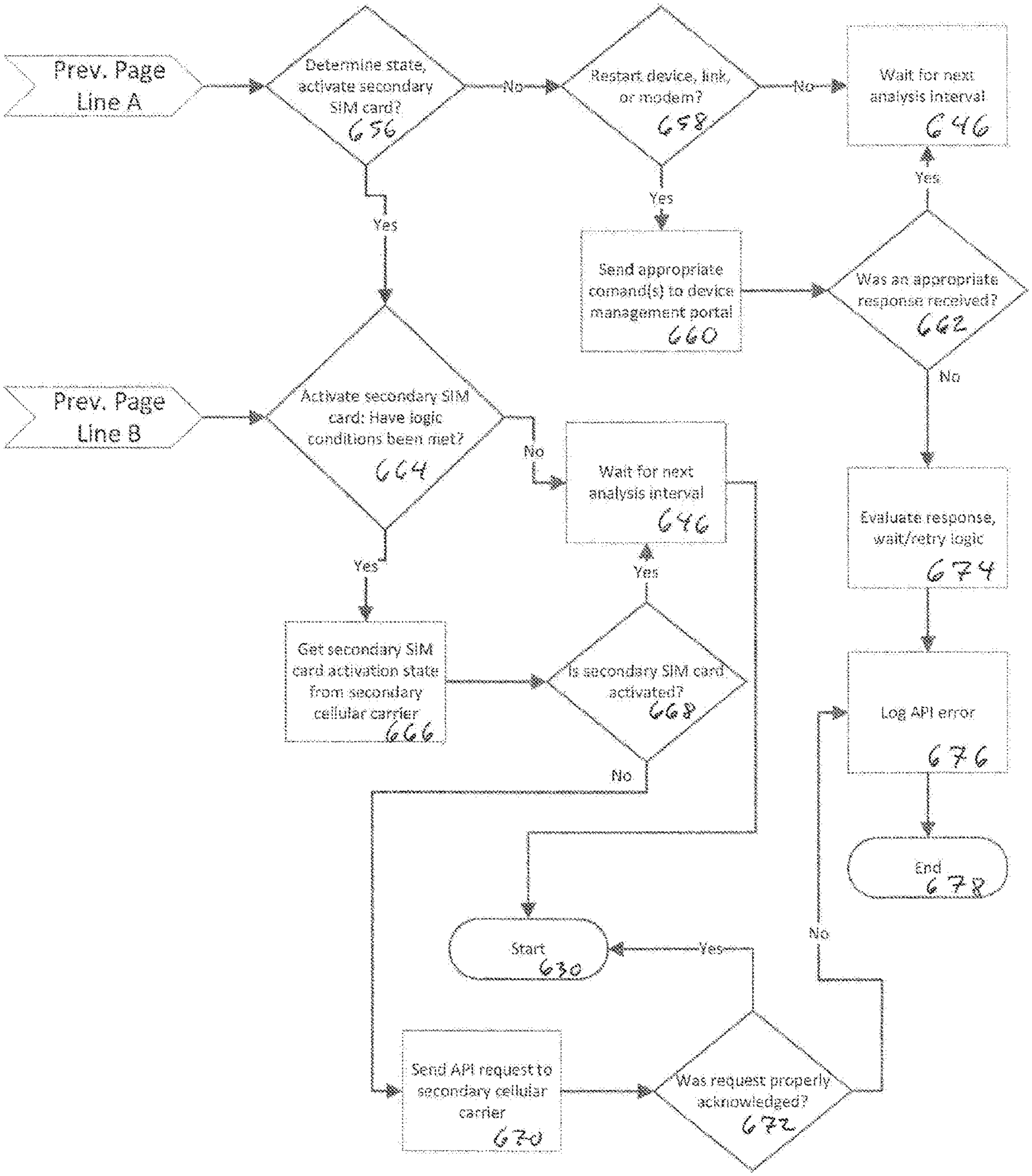

FIG. 6B shows a diagram of exemplary logic for use by the monitoring platform 22 in generating the request to the secondary carrier 18B. In one optional step, the monitoring platform 22 initiates the monitoring process (box 630). The system 22 may then optionally check whether the platform 100 is enabled (box 632). If the system 100 is not enabled, the monitoring platform 22 may optionally log the connection status information (box 644) and wait for the next analysis interval (box 646) before repeating the proceeding process (box 630).

In various implementations, the analysis interval is a specific amount of time between expected pulses from the probe 10 or other connection validation. The analysis interval may be user-defined, set through an artificial intelligence determination, through machine learning, or any other relevant method for selecting interval times and refresh rates known in the art.

If the monitoring process is enabled, the monitoring platform 22 optionally determines if the edge device 12 is adequately connected to a network (box 634). In a further optional step, if the edge device 12 is adequately connected, the monitoring platform 22 determines if the primary carrier 18A is active (box 636). If the primary carrier 18A is active, the monitoring platform 22 may optionally log the connection status (box 642), and await the next analysis interval (box 646).

In a further optional step, if the primary carrier 18A is not active (box 636), the monitoring platform 22 determines if the secondary carrier 18B is active (box 638). If the secondary carrier 18B is not active, the monitoring platform 22 awaits the next analysis interval (box 646). If the secondary carrier 18B is active (box 638), the monitoring platform 22 optionally logs the connection status information (box 640) and determines if additional logic processing is necessary (box 648).

In various implementations, the additional logic processing includes various peripheral or restorative functions such as, but not limited to, sending commands to other devices, notifying users of statuses, restarting various devices, or sending API requests to data carriers, such as to deactivate certain network systems. If the additional logic processing is necessary, the monitoring platform 22 optionally carries out the necessary logic (box 650). If the additional logic process is not necessary, the monitoring platform 22 awaits the next analysis interval (box 646).

In a further optional step, if the edge device 12 is not adequately connected, the monitoring platform 22 determines if the monitoring platform 22 can reach the edge device 12 through a device management portal (box 652). In various implementations, the device management portal is a local tool for the edge device 12 that allows for remote commands to be received by the edge device 12. For the device management portal to be accessible to the monitoring platform 22, the edge device 12 typically must still be connected to the primary network system 17A. The device management portal is typically only accessible during connection interruptions when those interruptions consist of a less-than-total loss of transmission.

In another optional step, if the edge device 12 cannot be reached through the device management portal, the monitoring platform 22 determines whether or not the relevant logic conditions have been met with regards to activating the secondary CLT/SIM card 14B (box 664). These logic conditions are typically set according to application-specific requirements, as would be understood. The logic conditions include, but are not limited to, time lapsed with an interrupted connection, number or reconnections attempted, and current estimated demand.

In one optional step, if the logic conditions have not been met, the monitoring platform 22 waits for the next analysis interval (box 646).

In another optional step, if the logic conditions have been met, the monitoring platform 22 determines the activation state of the secondary CLT/SIM card/connection (box 666). The monitoring platform 22 then determines if the secondary connection is active or not active (box 668).

If the secondary connection is not active, the monitoring platform 22 optionally sends a request to the secondary carrier 18B to activate the secondary CLT/SIM card 14B/connection (box 670). The monitoring platform 22 then determines if the request was properly acknowledged by the secondary carrier 18B (box 672 If the request was not properly acknowledged, the monitoring platform 22 optionally logs an error (box 676), and optionally ends the process (box 678). Alternatively, if the request was not properly acknowledged an alert may be sent to a user.

If the state of the secondary CLT/SIM card 14B/connection is active, the monitoring platform 22 waits for the next analysis interval (box 646).

In one optional step, if the edge device 12 can be reached through the device management portal, the monitoring platform 22 determines whether the connection fault with the edge device 12 can be solved by activating the secondary CLT/SIM card 14B/connection or if another issue can resolve the fault (box 656). If the connection fault requires the secondary CLT/SIM card 14B/connection to be activated, then the monitoring platform 22 determines whether or not the relevant logic conditions have been met with regards to activating the secondary CLT/SIM card 14B/connection (box 664). If the logic conditions have not been met, the monitoring platform 22 optionally waits for the next analysis interval (box 646). If the logic conditions have been met, the monitoring platform 22 determines the secondary CLT/SIM card 14B/connection activation state (box 666).

In another optional step, the monitoring platform 22 determines if the connection is active or not active (box 668). If the connection is not active, the monitoring platform 22 optionally sends an API request to the secondary carrier 18B to activate the secondary CLT/SIM card 14B/connection (box 670). The monitoring platform 22 may then determine if the request was properly acknowledged by the secondary carrier 18B (box 672). If the request was not properly acknowledged, the monitoring platform 22 optionally logs an API error (box 676), and optionally ends the process (box 678). If the state of the secondary CLT/SIM card 14B is active, the monitoring platform 22 optionally waits for the next analysis interval (box 646).

If the connection interruption does not require the activation of the secondary CLT/SIM card 14B/connection for resolution, the monitoring platform 22 may determine if a local action by the edge device 12 is appropriate. The local actions may include restarting the edge device 12, restarting one or more modems contained in the edge device 12, restarting one or more related modems not contained in the edge device 12, releasing and renewing dynamic host configuration protocol addresses, enabling or disabling specific connections within the system 100, modifying radio frequency ("RF") parameters relating to cellular connectivity (such as selecting a specific channel or disabling a specific channel), enabling or disabling specific ethernet interfaces, enabling or disabling Wi-Fi interfaces, issuing additional troubleshooting or remediation commands, or troubleshooting in various other ways known to those in the art (box 658).

Whether a local action is determined appropriate can be based on user specified parameters, parameters determined by an artificial intelligence program, parameters based on a machine learning algorithm, or other programming methods known in the art. If a local action is appropriate, the monitoring platform 22 will send the relevant command to effectuate the action (box 660). The monitoring platform 22 will then optionally determine if an appropriate response followed the command (box 662). If an appropriate response was not followed, the monitoring platform 22 will optionally determine whether to wait or retry the command (box 674).

The monitoring platform 22 may then optionally log the error (box 676) and optionally end the process (box 678). If the appropriate response to the command was received, the monitoring platform 22 will optionally wait for the next analysis interval (box 646). If a local action is not appropriate, the monitoring platform 22 will optionally wait for the next analysis interval (box 646).

Figure 7:
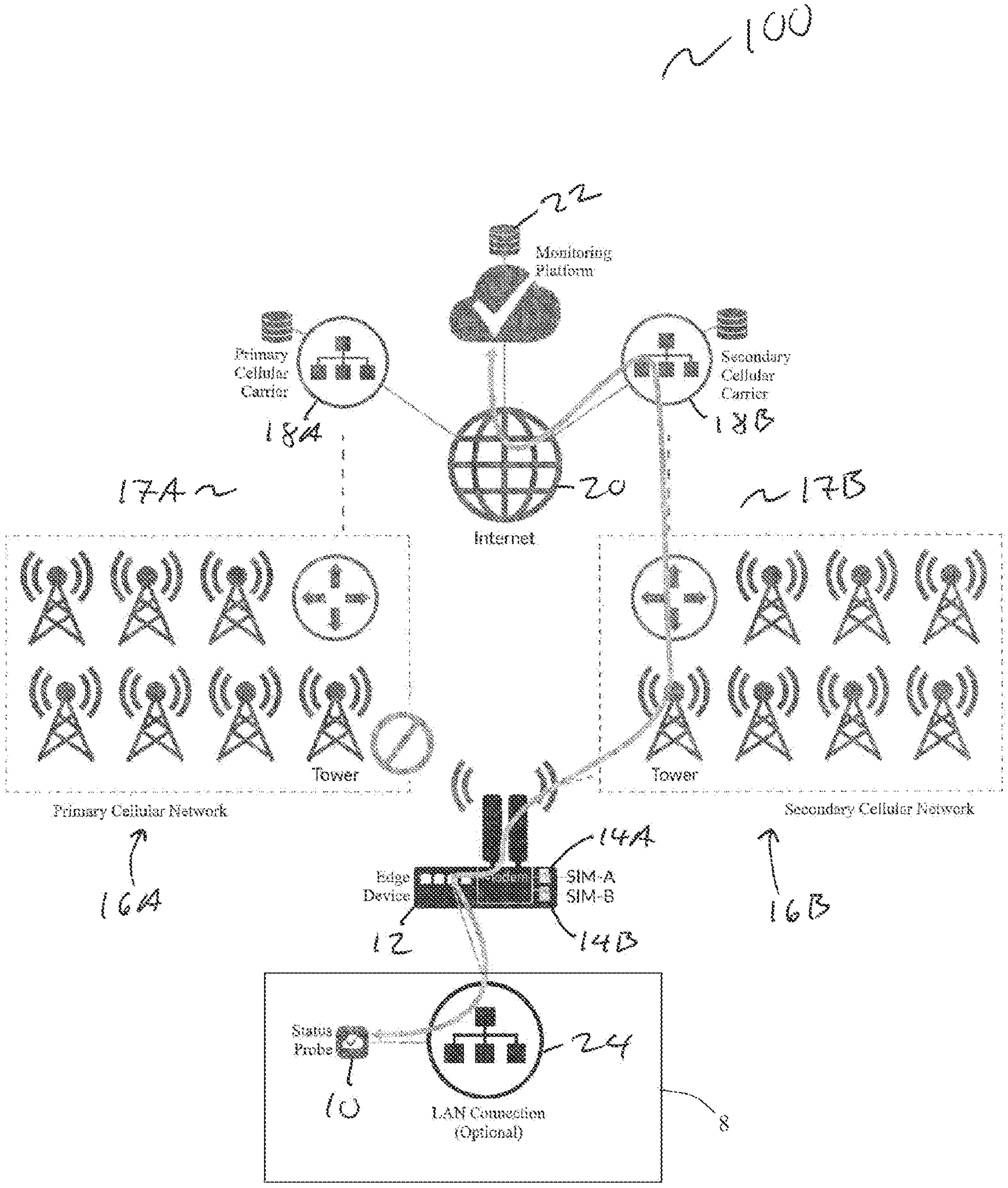
FIG. 7 is a diagram of the system using a secondary connection obtained by activating a secondary cellular network, according to one implementation.

FIG. 7 shows a diagram of the system 100 where the secondary carrier 18B has activated the secondary CLT/SIM card 14B/connection. The activation of the secondary CLT/SIM card 14B/connection allows the edge device 12 to connect to the internet 20 through the secondary network 16B. Once the edge device 12 is connected to a network, and optionally the internet 20, again, the monitoring platform 22 can once again receive the pulses sent by the probe 10.

Figure 8:
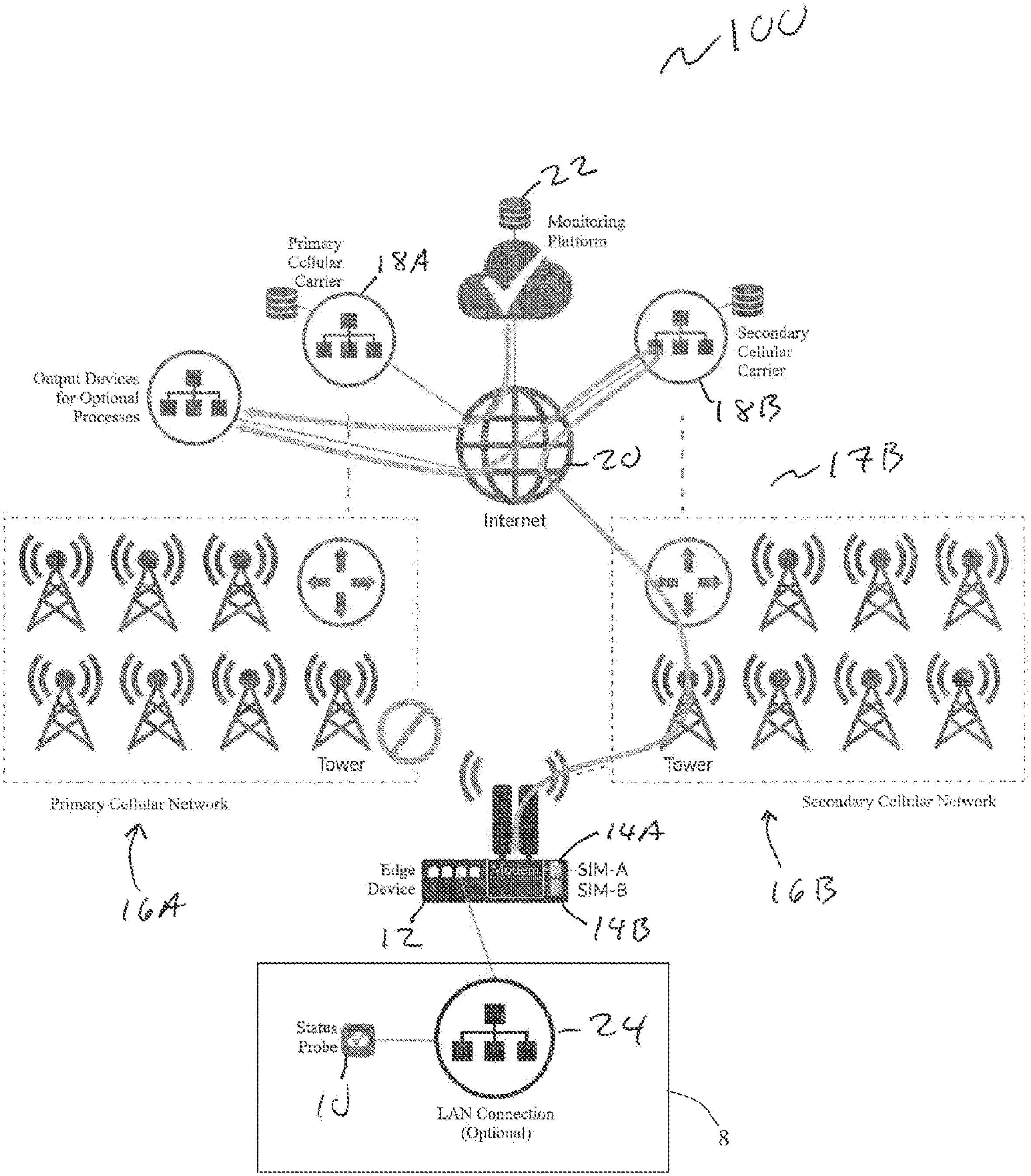
FIG. 8 is a diagram of an the system using a cellular network undertaking additional procedures after connectivity has been regained, according to one implementation.

FIG. 8 shows a diagram of the system 100 executing an optional process such as reconfiguring connectivity settings for the primary carrier 18A, such as restricting connectivity to use only specific frequency bands; disabling the primary CLT/SIM card 14A by sending a request to the primary carrier 18A; sending alerts to users to notify them of status changes; sending alerts to users to recommend follow-up actions; and monitoring connectivity, quality latency, and other performance metrics for a period of time, and taking additional actions based on the monitoring results.

In various implementations, once the monitoring platform 22 has activated the secondary network 16B so the electronic communications flow through the secondary network system 17B rather than the primary network system 17A, the monitoring platform 22 can be further configured to return the system 100 to its prior state after the connectivity of the primary network system 17A has been restored. Once the monitoring platform 22 has an indication that connectivity of the primary network system 17A has been restored, through signal monitoring, manual input, or other means known in the art, the monitoring platform 22 can send a request to the secondary carrier 18B to deactivate the secondary CLT/SIM card 14B/connection. After this and because of the primary network system's 17A restored connectivity, electronic communications will resume through the primary network system 17A. This will also allow for the cessation of required fees for the active operation of the secondary network system 17B.

In various implementations, once the monitoring platform 22 has activated the secondary cellular network 16B so the electronic communications flow through the secondary network system 17B rather than the primary network system 17A, the monitoring platform 22 can be further configured to deactivate the primary network system 17A to rely on the secondary network system 17B for connectivity until another connection interruption event occurs. The primary network system 17A, in this implementation, uses dynamic provisioning and can receive a request from the monitoring platform 22 to deactivate the primary CLT/SIM card 14A/connection.

In various implementations, the monitoring platform 22 can log connectivity and usage data for the network and determine periods of high demand. In these implementations, the monitoring platform 22 can activate the secondary network system 17B or other relevant network systems to provide additional data capacity to users of the network. The monitoring platform 22 can likewise deactivate unnecessary network systems for periods of lesser demand.

In various implementations, the system 100 and monitoring platform 22 are configured to generate and send reports and notifications about connection status and other data points to device 8, owners, technology teams, and others. The system 100 and monitoring platform 22 may automatically generate trouble tickets to be send to a carrier when the carrier network is found to be down.

In certain implementation, when the system 100 initiates a secondary connection the monitoring platform 22 logs that the secondary connection is in use and the uptime for that connection such that billing for that secondary connection can be reconciled based on the date of service and other technical factors related to cellular data plans, termination policies, etc. as would be understood.

It is understood that while various implementations of the system 100 described above employ two data carriers 16A, 16B, any larger number could be employed. It is understood that various implementations of the system 100 are scalable such that any number of the various components can be used.

It is understood that the logic executed by the system 100, such as the logic executed by the monitoring platform 22, by the edge device 12, and any other logic employed, can be executed by means of an artificial intelligence program, a machine learning program, a manually coded program, or any combination thereof, in addition to other methods known in the art. In various implementations, the monitoring platform 22 uses an artificial intelligence program in combination with a machine learning program, which would allow the artificial intelligence program to continuously improve its performance during continuing operation. Performance can be measured by any desired metric known in the art, but is typically characterized by accuracy, reliability, and responsiveness of the program.

In one exemplary implementation, the system 100 may be implemented on an autonomous vehicles or in full self-driving applications where reliability of connectivity is of paramount importance. As these vehicles travel, they will commonly traverse multiple cellular networks, as would be understood. While these vehicles are designed to cache maps and other information to achieve full self-driving or autonomous operations, connectivity still important to bring current traffic congestion, road construction, weather, and other information to the vehicle during operation. The system 100 described herein could be implemented in conjunction with autonomous vehicles to ensure uninterrupted connectivity for the vehicle.

It would be understood in light of this disclosure that the disclosed devices, systems, and method provide various advantages over known technology. The system 100 allows for immediately and autonomously repairing the network connectivity issues. This increased speed of repair and autonomous repairs reduces downtime, reduces costs, reduces labor required in troubleshooting problems, reduces frustration and minimizes customer impact.

Although the disclosure has been described with reference to preferred implementations, persons skilled in the art will recognize that changes may be made in form and detail without departing from the spirit and scope of the disclosed systems, methods, and devices.

What is claimed is:

1. A system for maintaining network connectivity comprising:

(a) a network connected device;

(b) a probe in communication with the network connected device; and (c) a monitoring platform in electronic communication with the network connected device through a first data carrier, wherein the monitoring platform is configured to monitor the state of a connection between the network connected device and the first data carrier, and wherein the monitoring platform is configured to activate a second data carrier when the connection between the network connected device and the first data carrier is interrupted, and wherein the monitoring platform activates the second data carrier by sending an API request to the second data carrier.

2. The system of claim 1, wherein the probe is a hardware or software appliance capable of sending packets to the monitoring platform.

3. The system of claim 1, further comprising an edge device in communication with the network connected device and wherein the edge device connects the network connected device to the first data carrier and the second data carrier.

4. The system of claim 3, wherein the monitoring platform determines connection interruptions by monitoring one or more of signal level, signal-to-noise ratio, latency, signal interference, data throughput, jitter, and error rate.

5. The system of claim 1, wherein the first data carrier and the second data carrier are cellular data carriers.

6. The system of claim 1, wherein the second data carrier is inactive then the first data carrier is active.

7. The system of claim 1, wherein an edge device in communication with the network connected device uses dynamic provisioning for activating the second data carrier.

8. A system for maintaining network connectivity comprising:

(a) a probe in communication with a networked device;

(b) an edge device in electronic communication with the probe; and (c) a monitoring platform in electronic communication with the edge device and the probe through a first data carrier, wherein the monitoring platform is configured to receive packets from the probe for monitoring a connection between the networked device and the first data carrier, and wherein the monitoring platform autonomously activates a second data carrier when the monitoring platform determines the connection between the networked device and the first data carrier is interrupted, and wherein the edge device uses dynamic provisioning for activating the second data carrier.

9. The system of claim 8, wherein the connection between the networked device and the first data carrier is interrupted when the connection is down for more than a threshold period of time.

10. The system of claim 9, wherein the threshold period of time varies based on the time of day or day of the week.

11. The system of claim 8, wherein the monitoring platform determines that the connection is interrupted by monitoring one or more of signal level, signal-to-noise ratio, latency, signal interference, data throughput, jitter, and error rate.

12. The system of claim 11, wherein the connection between the networked device and the first data carrier is interrupted when threshold levels for one or more of signal level, signal-to-noise ratio, latency, signal interference, data throughput, jitter, and error rate are exceeded.

13. The system of claim 8, wherein the second data carrier is inactive until the monitoring platform activates second data carrier by sending an API request.

14. A system for maintaining network connectivity comprising:

(a) a probe in electronic communication with a device;

(b) an edge device in electronic communication with the probe and the device;

(c) a monitoring platform electronically connected to the edge device and the probe through a first carrier wherein the monitoring platform periodically monitors a status of a connection between the edge device and the first carrier; and (d) computational logic contained in the monitoring platform capable of autonomously activating a second carrier when the connection between the edge device and the first carrier is interrupted, wherein the connection is interrupted when the connection is down for more than a threshold period of time and wherein the threshold period of time varies based on the time of day or day of the week, the second data carrier is inactive until monitoring platform activates the second data carrier by sending an API request, and the edge device uses dynamic provisioning for activating the second data carrier.

15. The system of claim 14, further comprising carrier link technology for providing connection to the first carrier and the second carrier.

16. The system of claim 14, wherein the monitoring platform is configured to reactivate the first carrier when the connection resumes or is within threshold values, and wherein the monitoring platform deactivates the second carrier when the first carrier is reactivated.

17. The system of claim 14, wherein the probe is a software or hardware appliance.

18. The system of claim 14, wherein the threshold values are determined based on business needs.

19. The system of claim 18, wherein the second data carrier is inactive until monitoring platform activates the second data carrier by sending an API request.

* * * * *